(12) United States Patent
Seo et al.

(10) Patent No.: US 12,401,131 B2
(45) Date of Patent: Aug. 26, 2025

(54) RADAR ANTENNA

(71) Applicant: AMOSENSE CO., LTD., Cheonan-si (KR)

(72) Inventors: Yunsik Seo, Cheonan-si (KR); Hyungil Baek, Cheonan-si (KR); Seho Lee, Cheonan-si (KR); Hyunjoo Park, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 267 days.

(21) Appl. No.: 18/034,696

(22) PCT Filed: Oct. 28, 2021

(86) PCT No.: PCT/KR2021/015265
§ 371 (c)(1),
(2) Date: Apr. 29, 2023

(87) PCT Pub. No.: WO2022/092830
PCT Pub. Date: May 5, 2022

(65) Prior Publication Data
US 2023/0395982 A1    Dec. 7, 2023

(30) Foreign Application Priority Data
Oct. 30, 2020  (KR) .................. 10-2020-0142690

(51) Int. Cl.
*H01Q 13/10*   (2006.01)
*G01S 7/03*    (2006.01)
*H01Q 1/52*    (2006.01)

(52) U.S. Cl.
CPC .............. *H01Q 13/106* (2013.01); *G01S 7/03* (2013.01); *H01Q 1/526* (2013.01)

(58) Field of Classification Search
CPC ...... H01Q 13/106; H01Q 1/526; H01Q 1/521; H01Q 21/064; H01Q 1/3233; G01S 7/03; G01S 7/038; G01S 13/931
See application file for complete search history.

(56) References Cited

U.S. PATENT DOCUMENTS 11,923,609 B2*  3/2024  Park ................. H01Q 13/18
2002/0101385 A1*  8/2002  Huor ................ H01Q 21/005
343/770

(Continued)

FOREIGN PATENT DOCUMENTS

CN      103811877 A    5/2014
JP      2007-013531 A  1/2007

(Continued)

OTHER PUBLICATIONS

KR Office Action dated Oct. 27, 2022 as received in Application No. 10-2020-0142690.

*Primary Examiner* — Hai V Tran
(74) *Attorney, Agent, or Firm* — Maschoff Brennan

(57) ABSTRACT

Disclosed is a radar antenna which has a shielding space corresponding to each antenna of an antenna body by using an accommodation hole of a shielding member to prevent mutual coupling between antennas. The disclosed radar antenna comprises an antenna body which has a first surface and a second surface and in which a plurality first slot groups are formed to be spaced apart from each other on the first surface, and a shielding member which is stacked on the first surface of the antenna body and in which a plurality of accommodation holes are formed to respectively overlap the plurality of first slot groups.

13 Claims, 16 Drawing Sheets

(56) References Cited

U.S. PATENT DOCUMENTS

| | | | |
|---|---|---|---|
| 2008/0316124 A1* | 12/2008 | Hook | H01Q 21/064 343/705 |
| 2017/0244173 A1* | 8/2017 | Moon | H01Q 13/106 |
| 2020/0059000 A1 | 2/2020 | Kamo et al. | |
| 2023/0231314 A1* | 7/2023 | Lim | H01Q 21/005 342/175 |

FOREIGN PATENT DOCUMENTS

| | | |
|---|---|---|
| JP | 2017-175595 A | 9/2017 |
| JP | 2020-031426 A | 2/2020 |

\* cited by examiner

[FIG. 1]
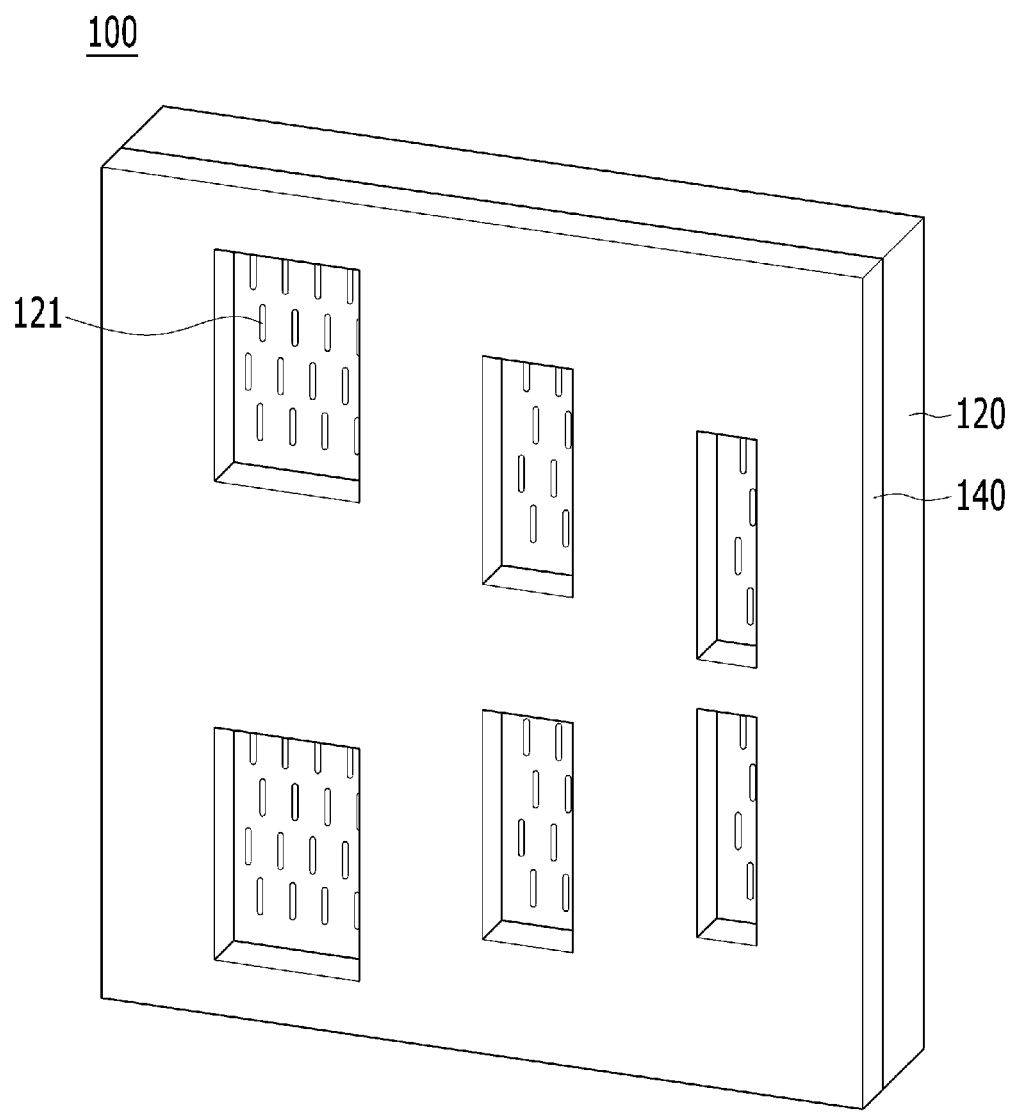

[FIG. 2]
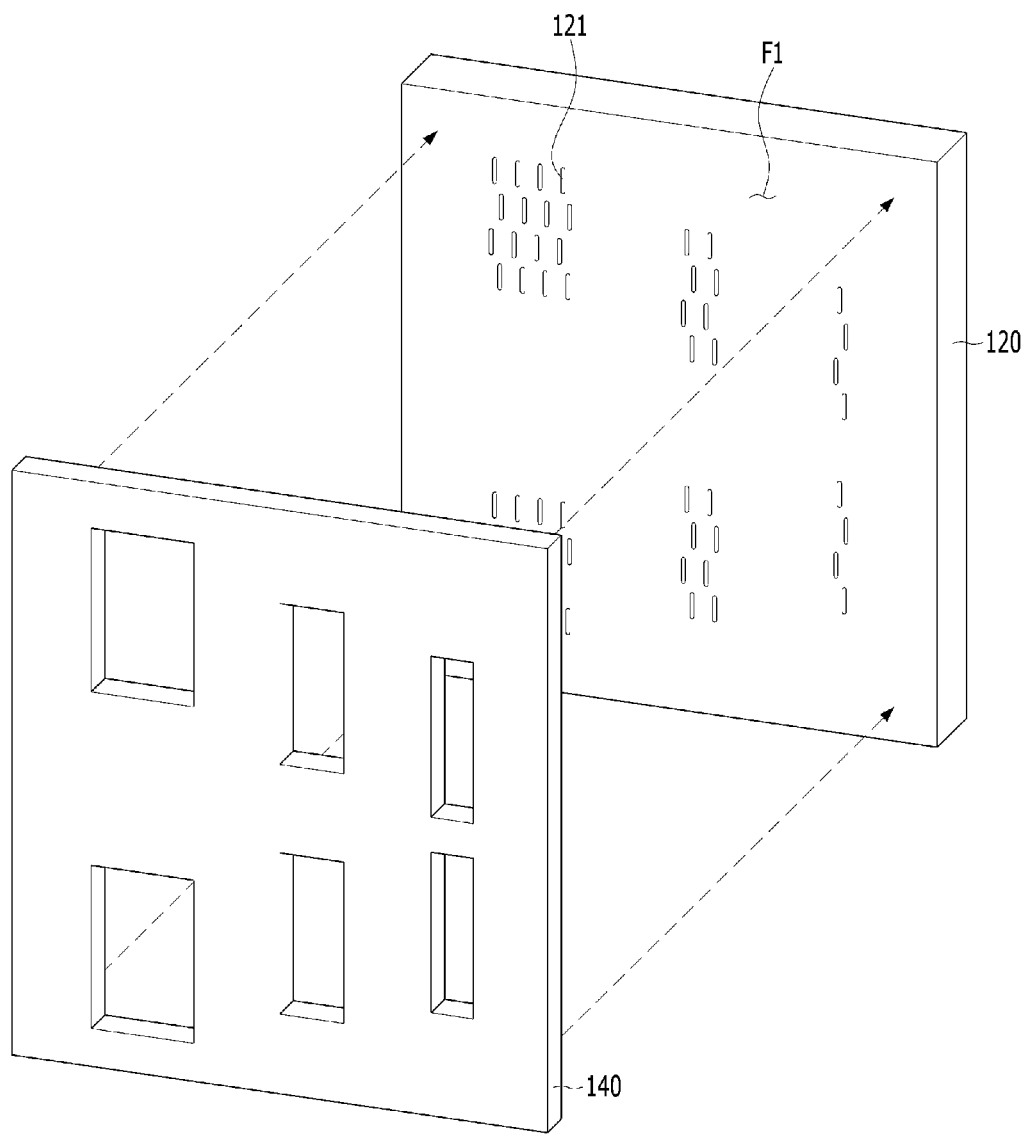

[FIG. 3]
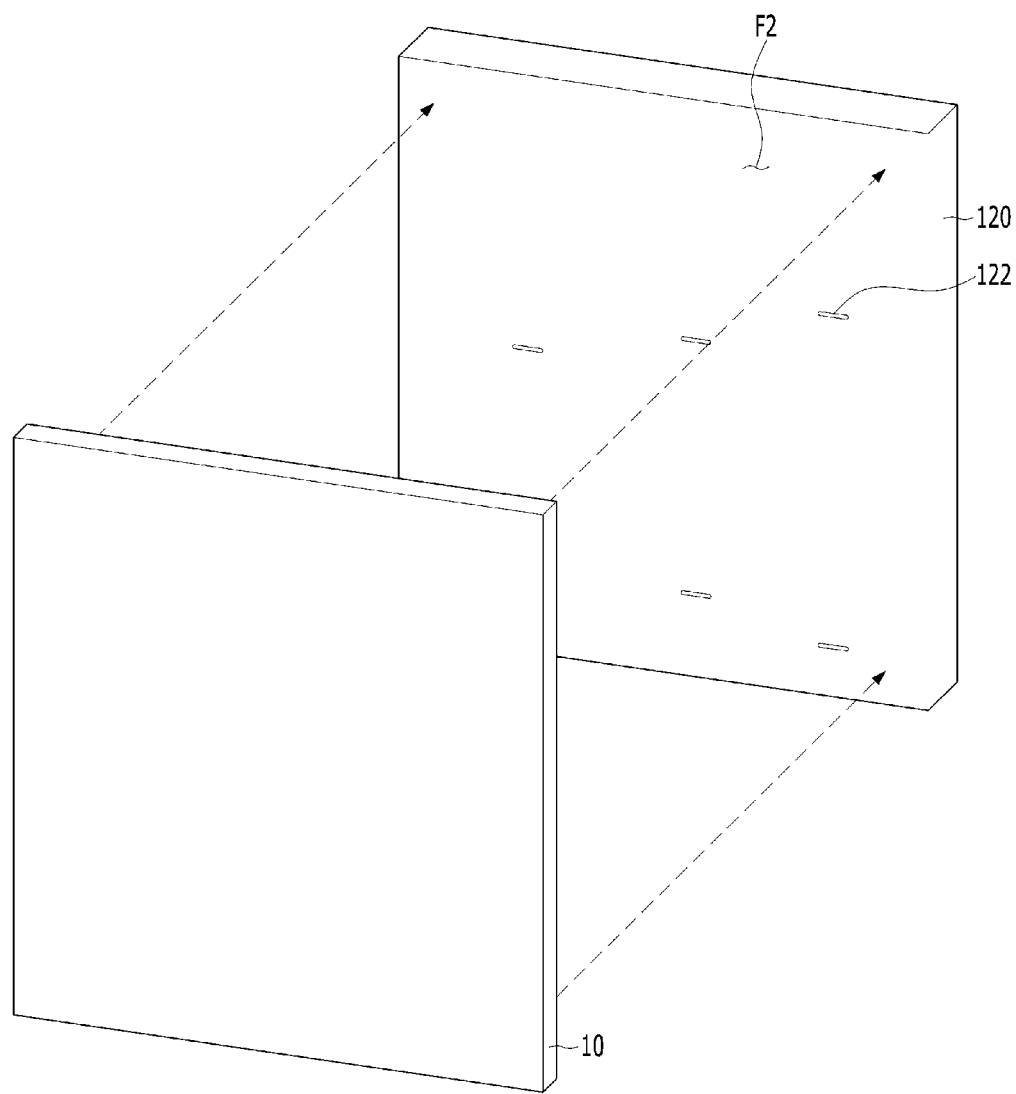

[FIG. 4]
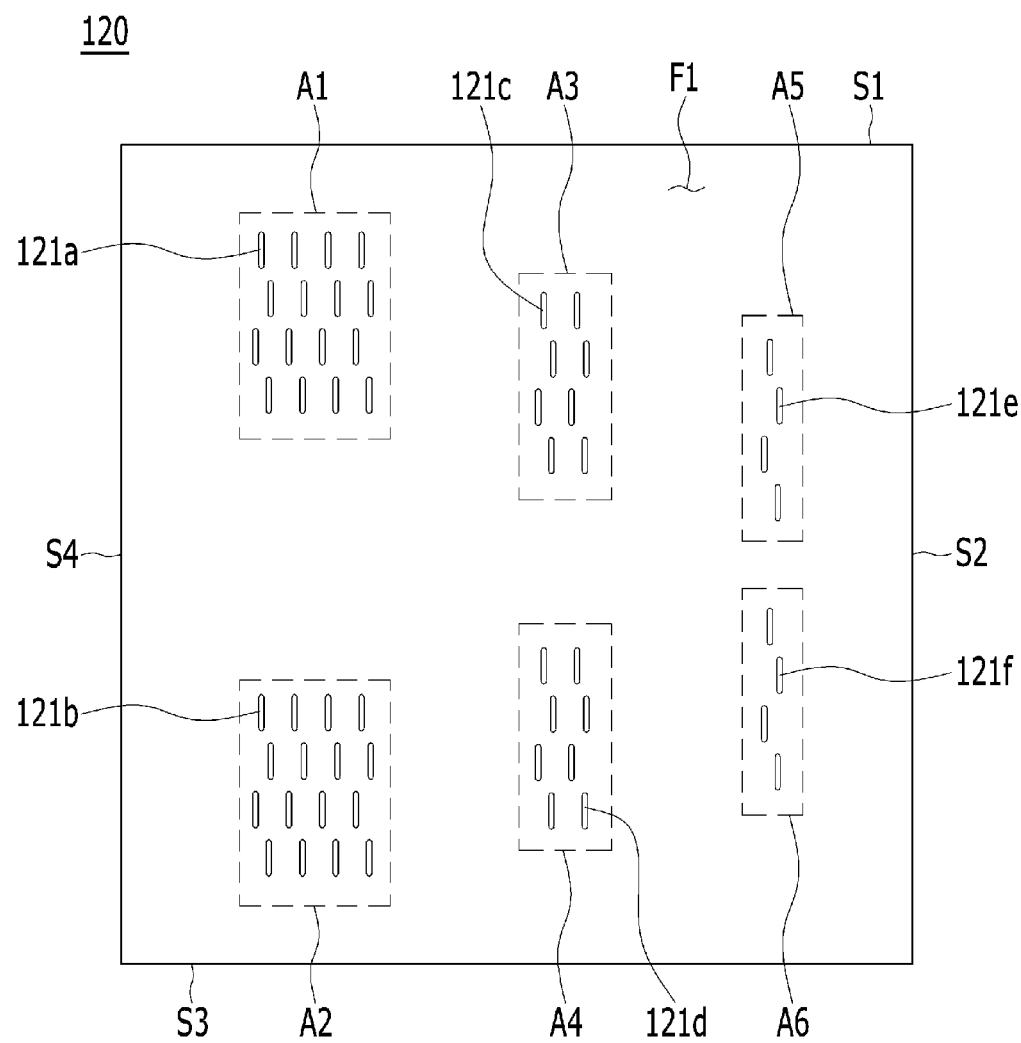

[FIG. 5]
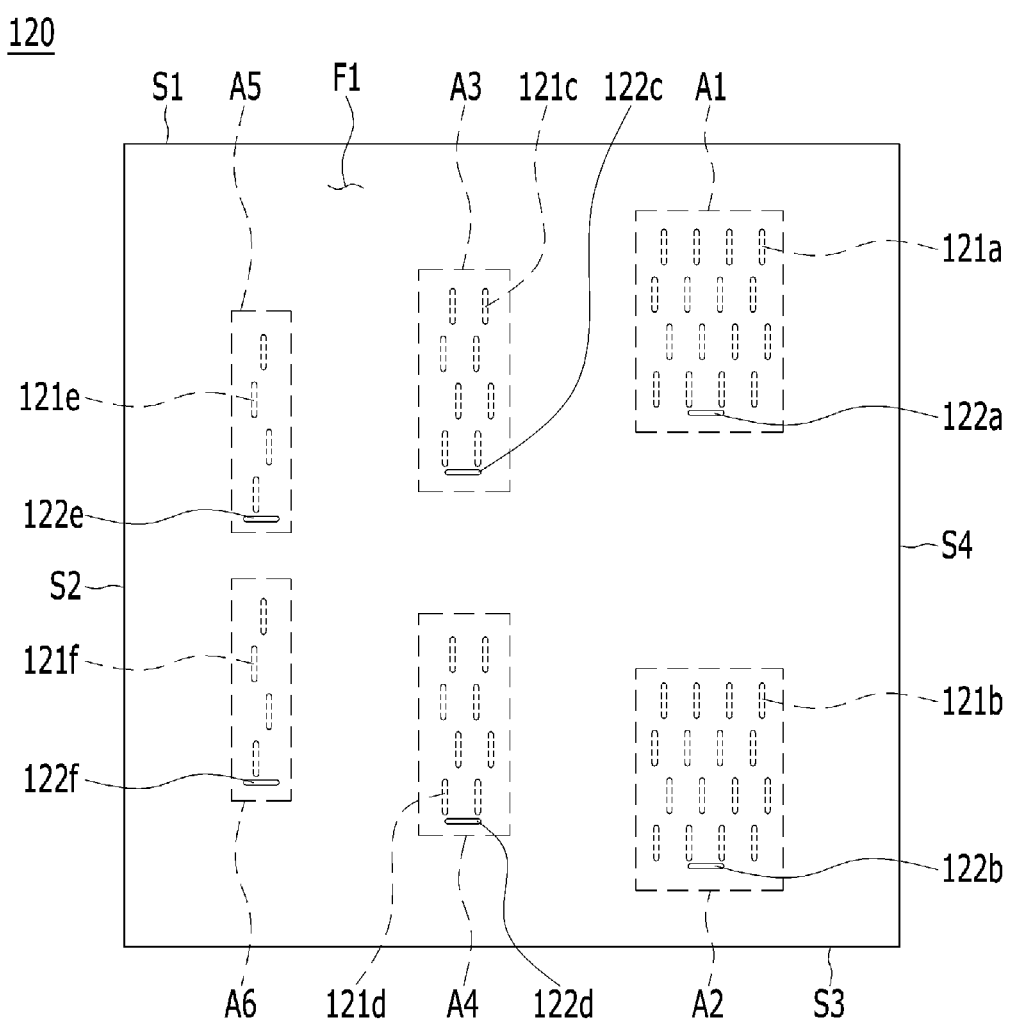

[FIG. 6]
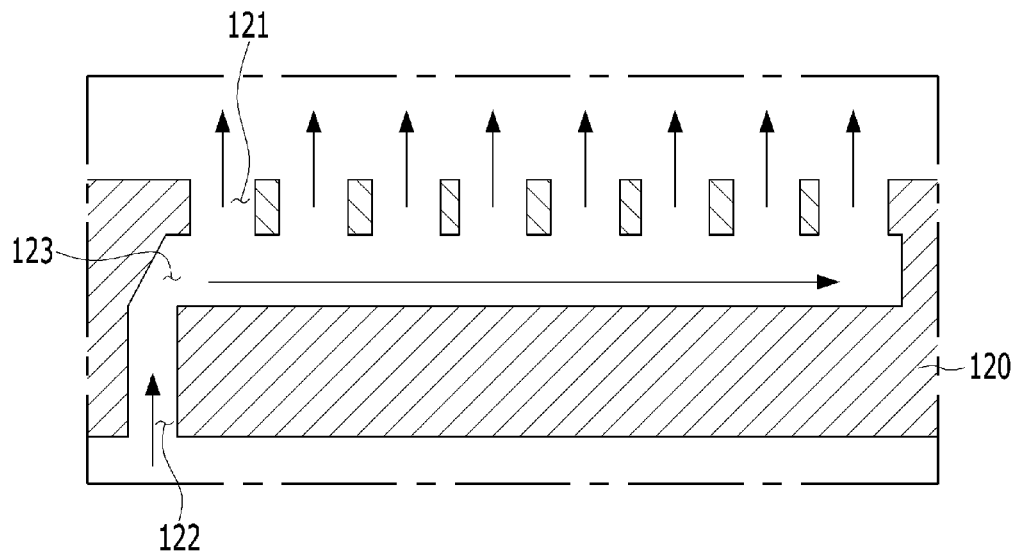
[FIG. 7]
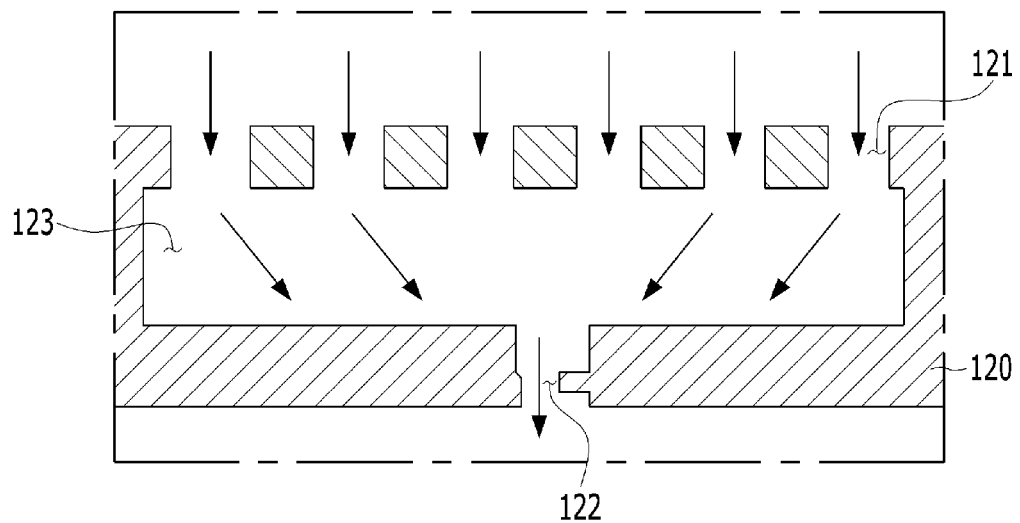

[FIG. 8]
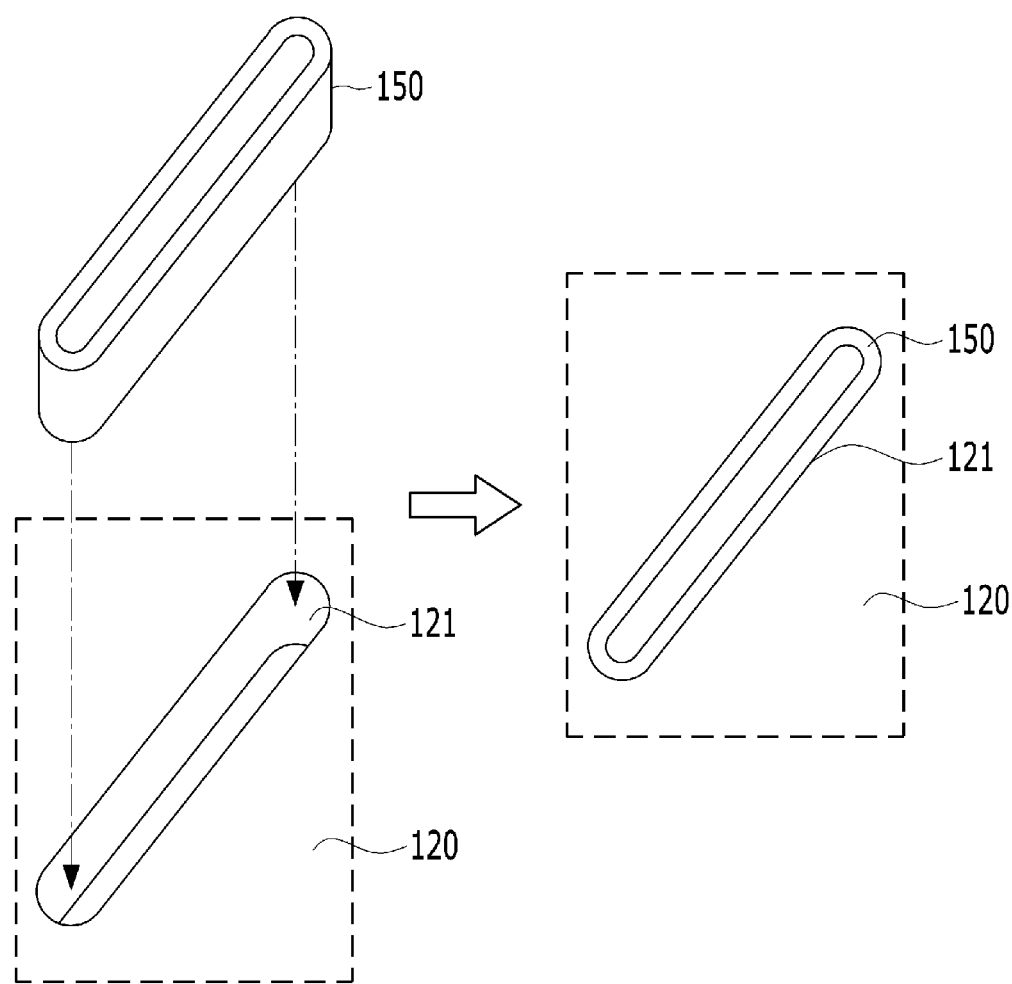

[FIG. 9]
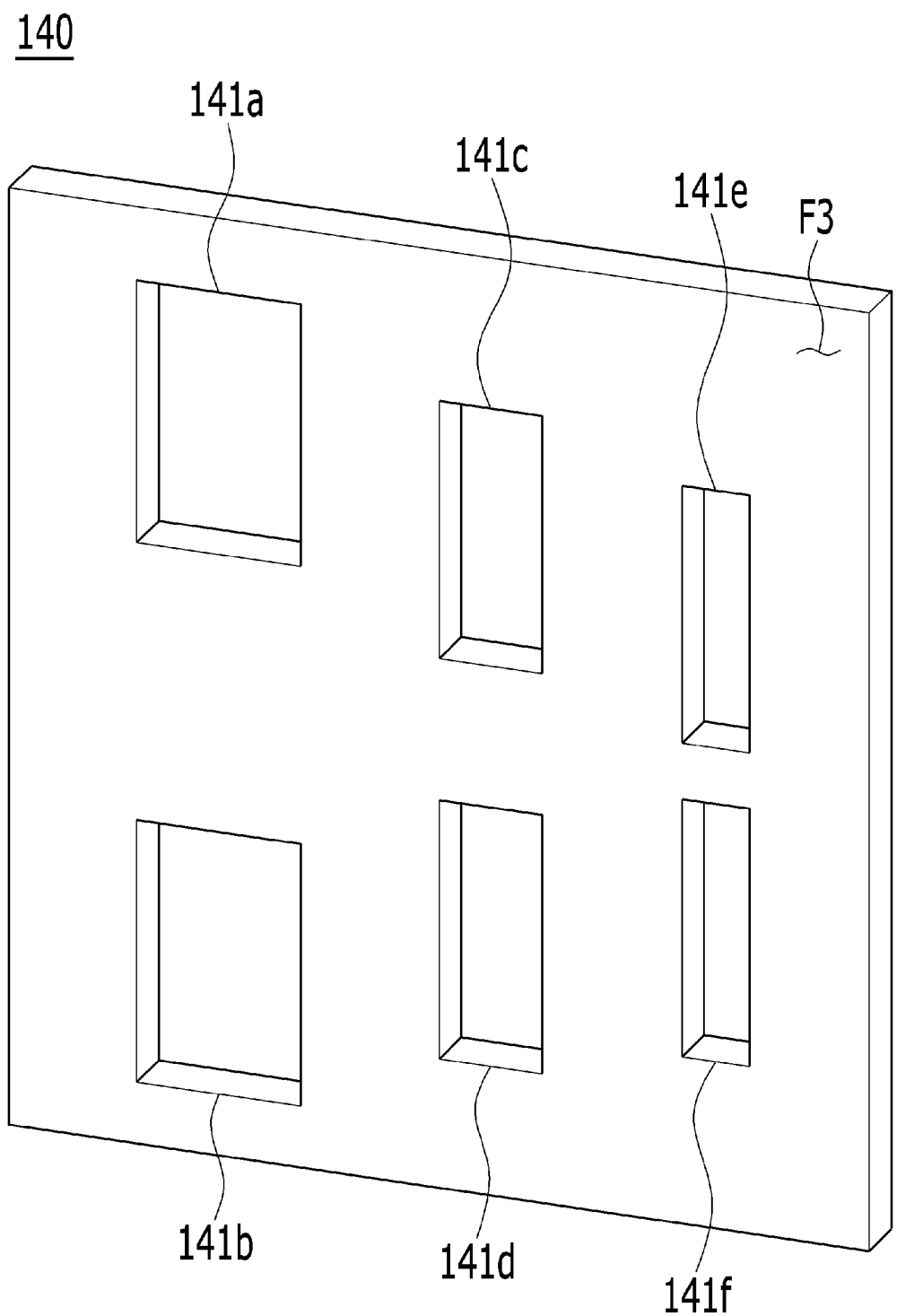

[FIG. 10]
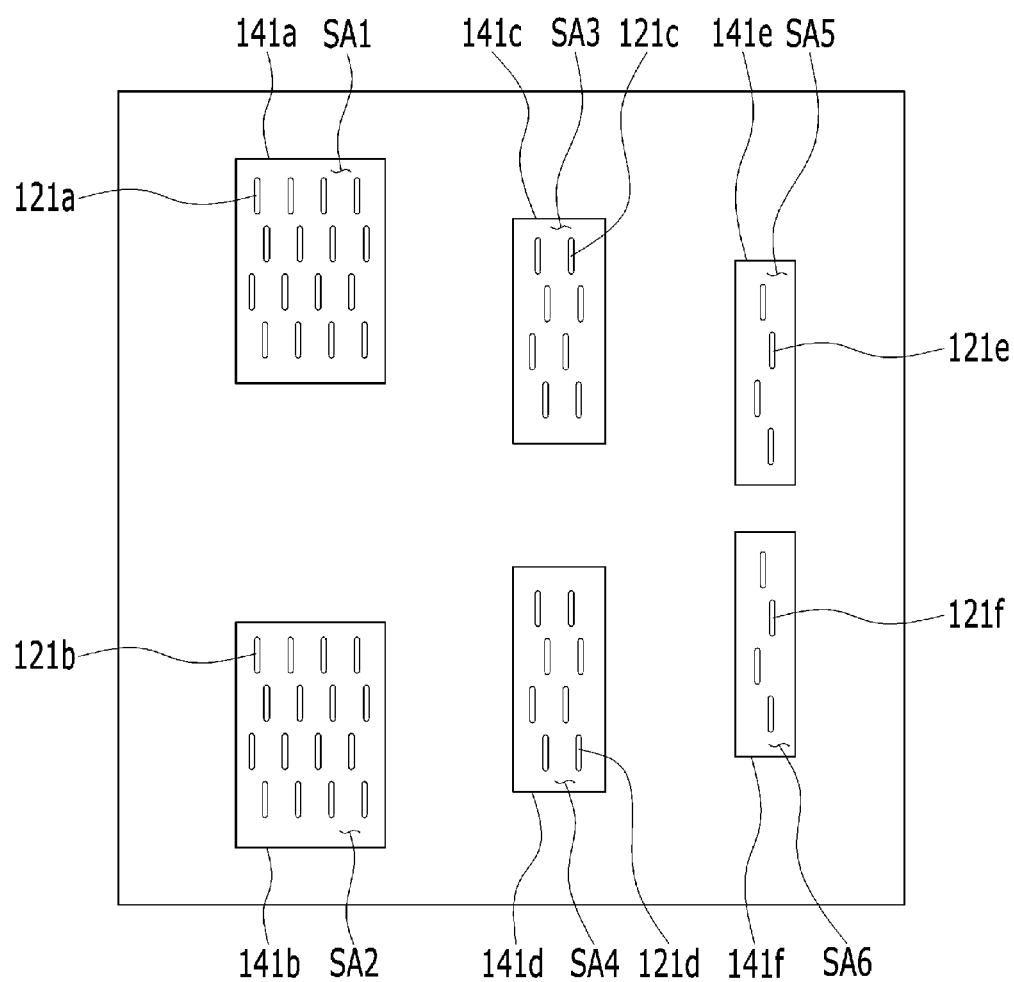

[FIG. 11]
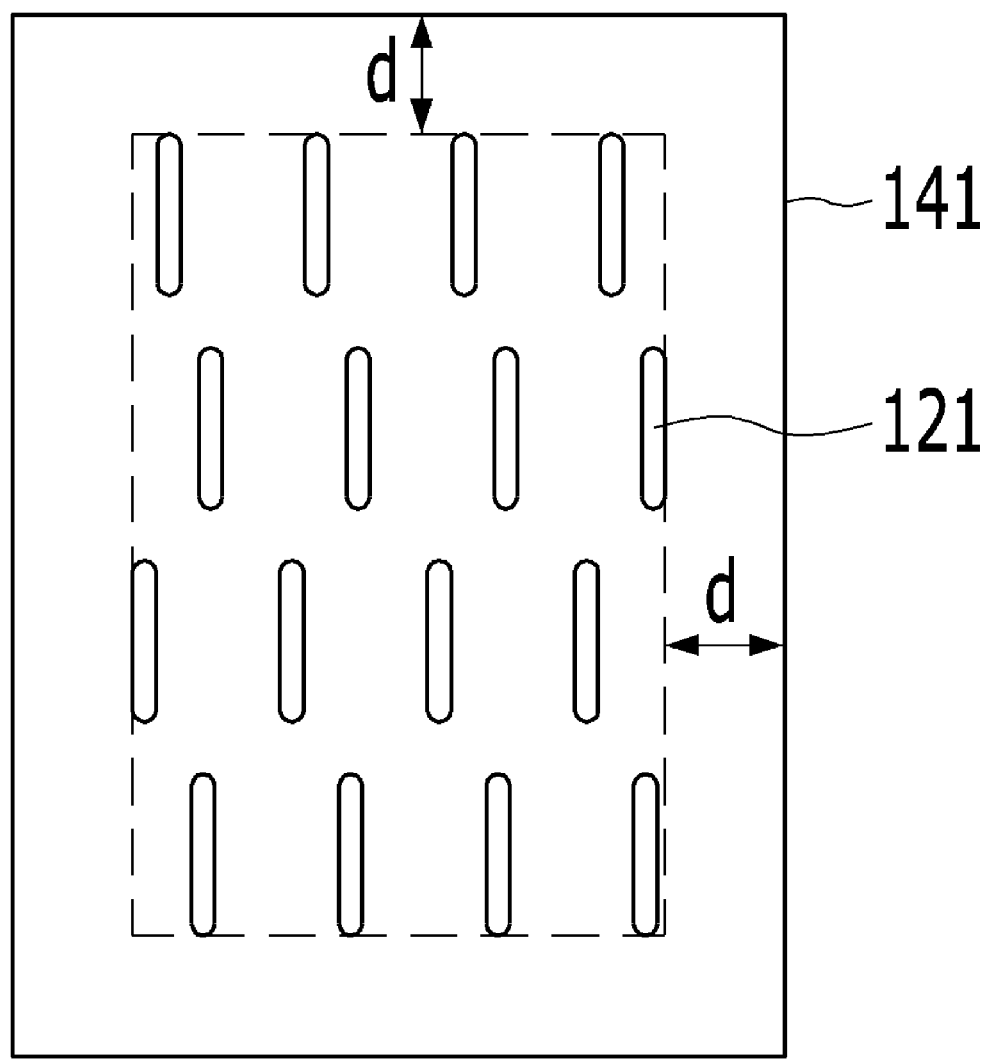

[FIG. 12]
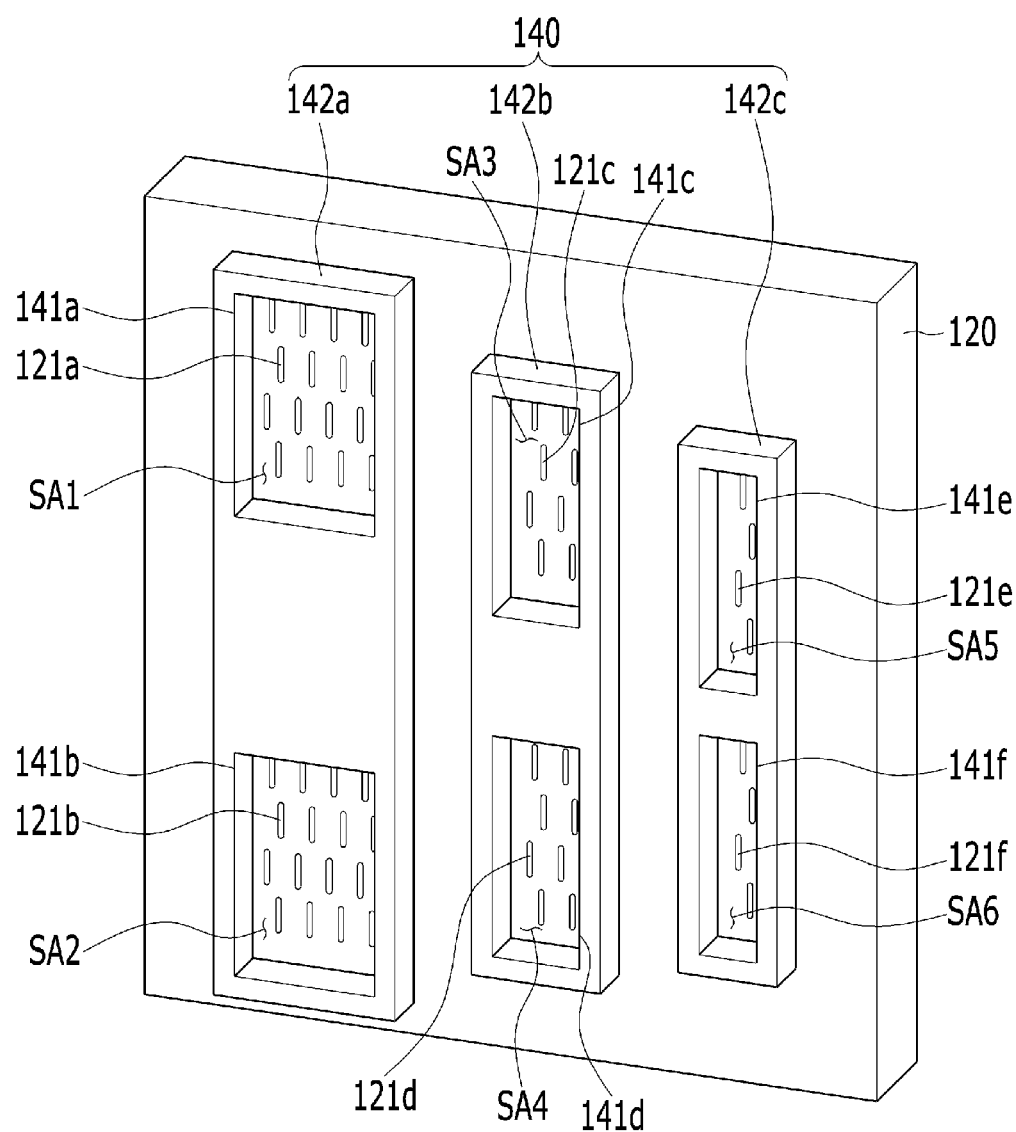

[FIG. 13]
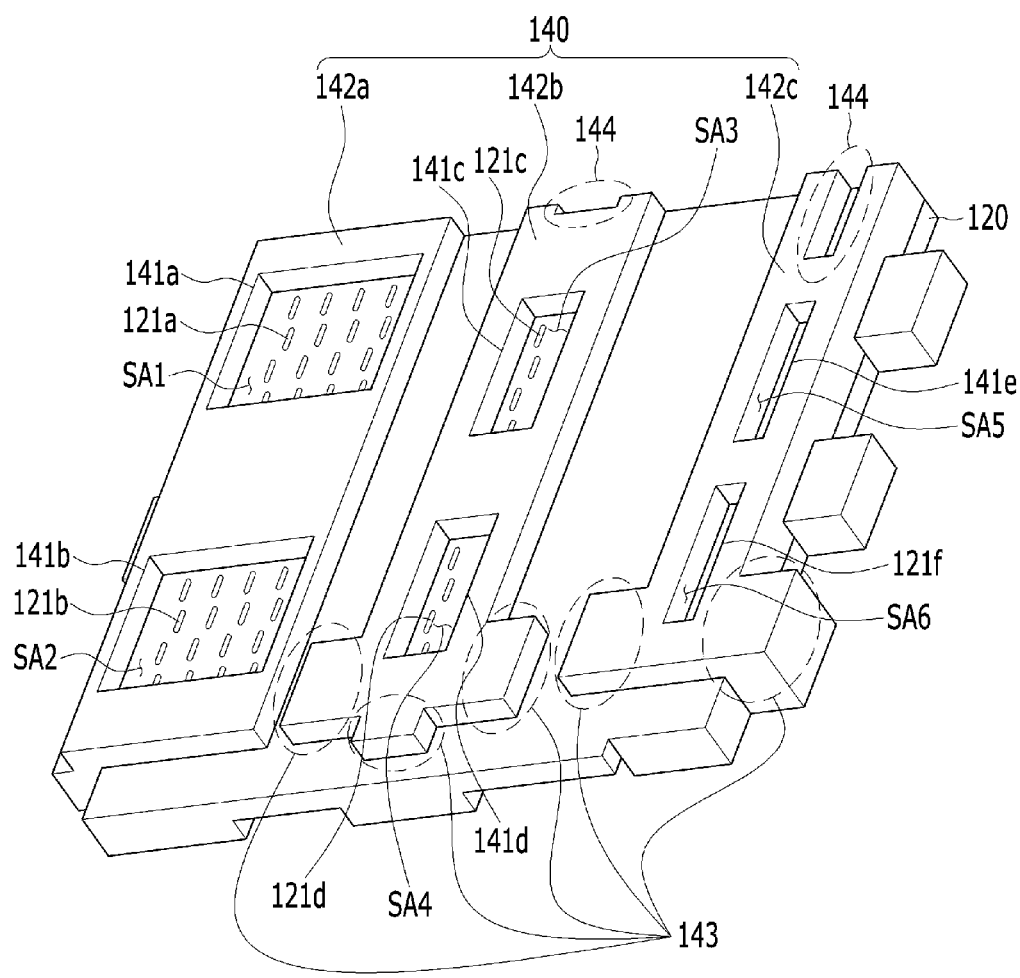

[FIG. 14]
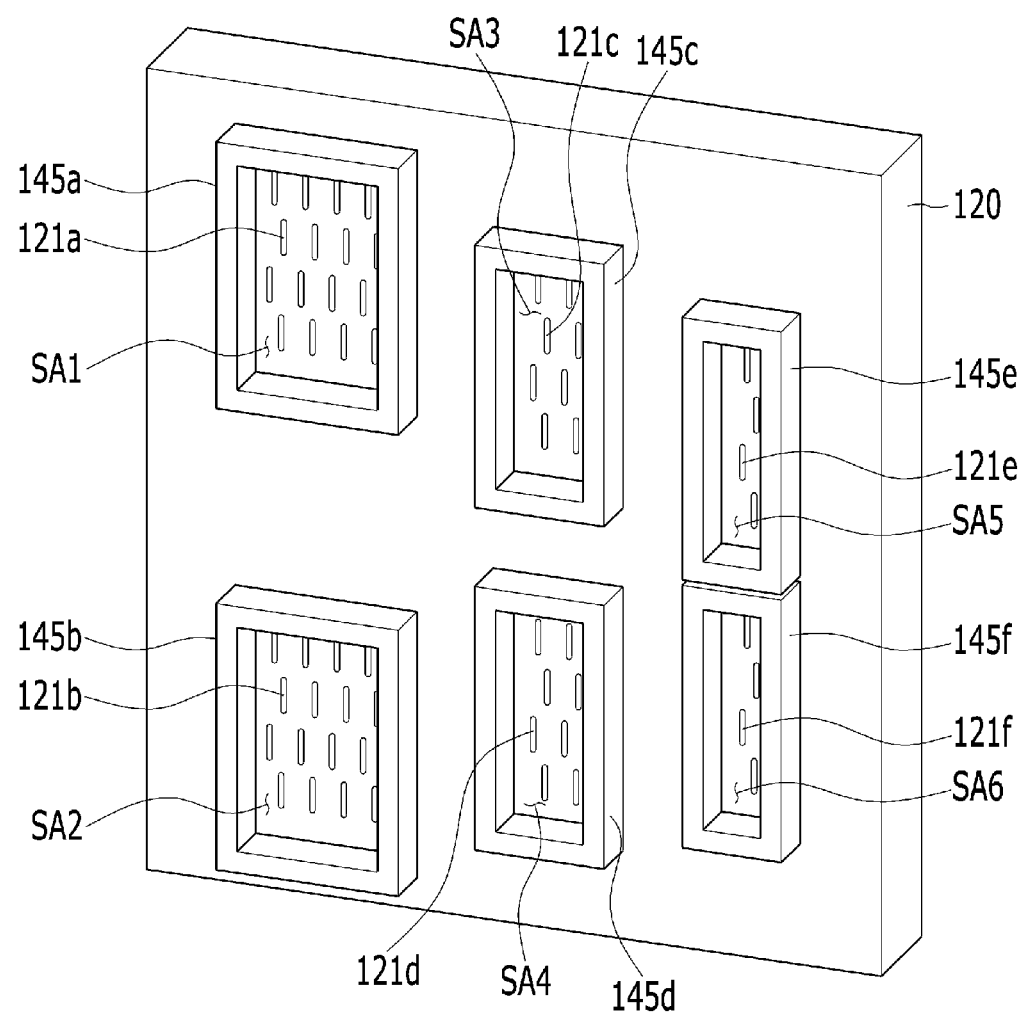

[FIG. 15]
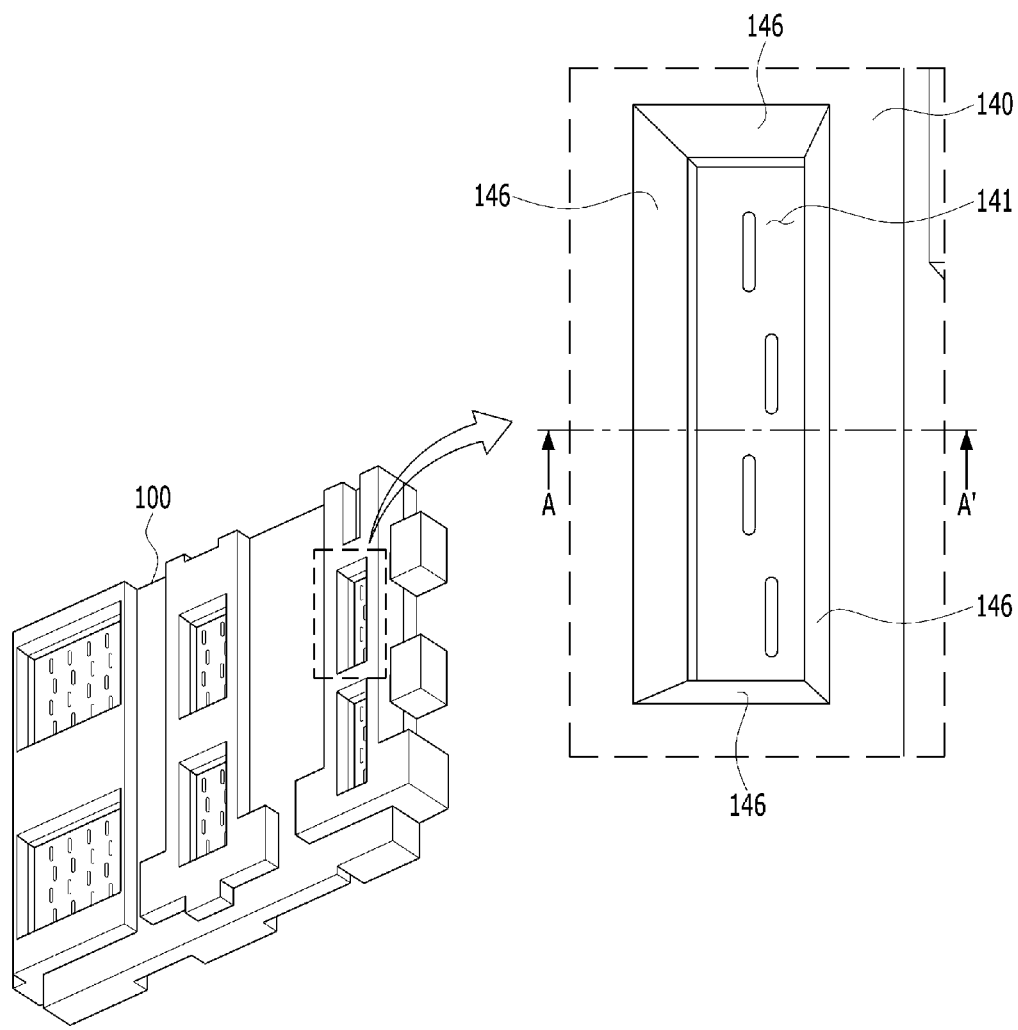

[FIG. 16]
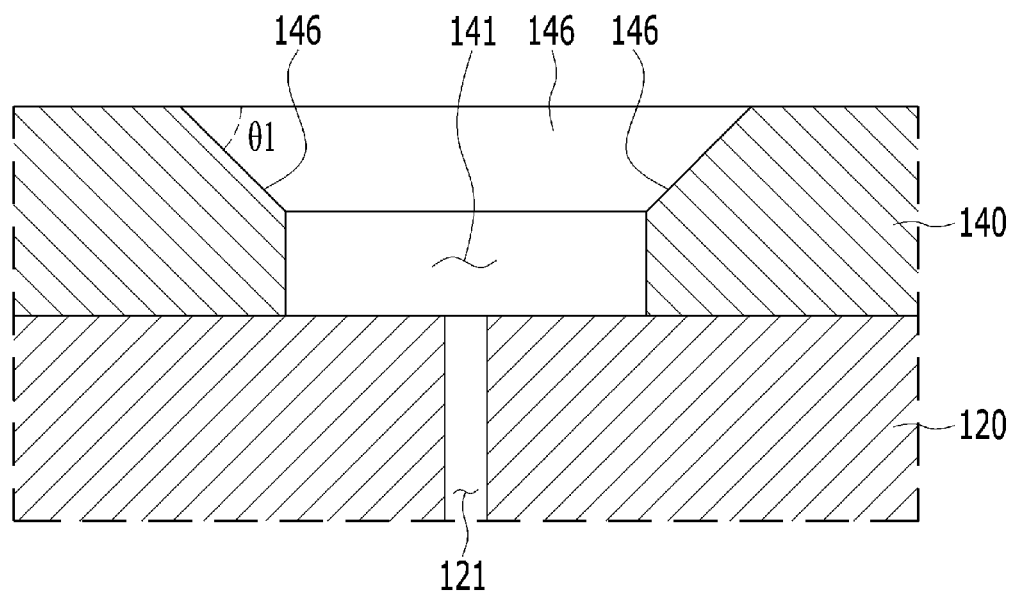
[FIG. 17]
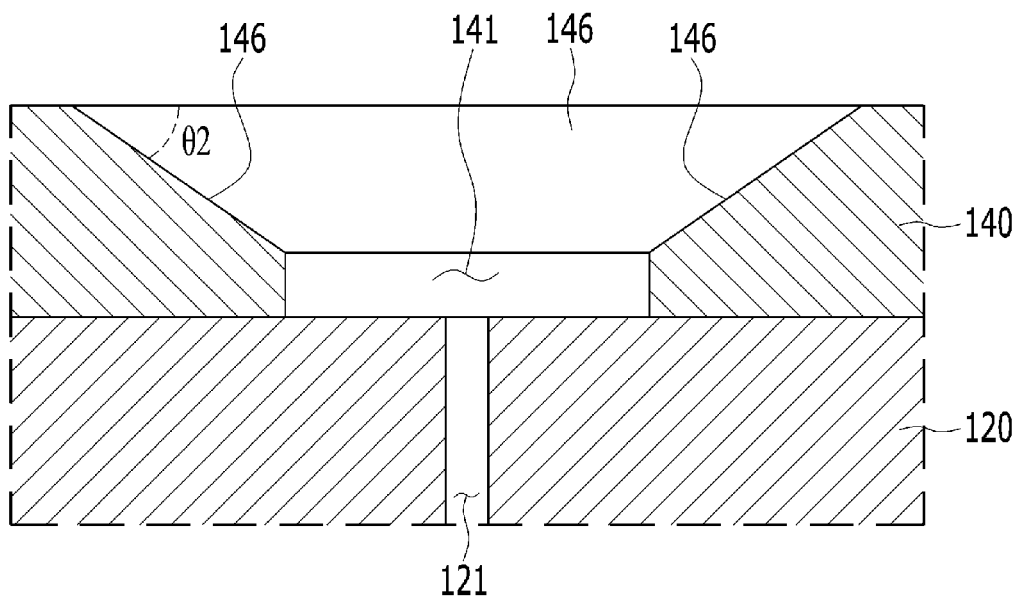

[FIG. 18]
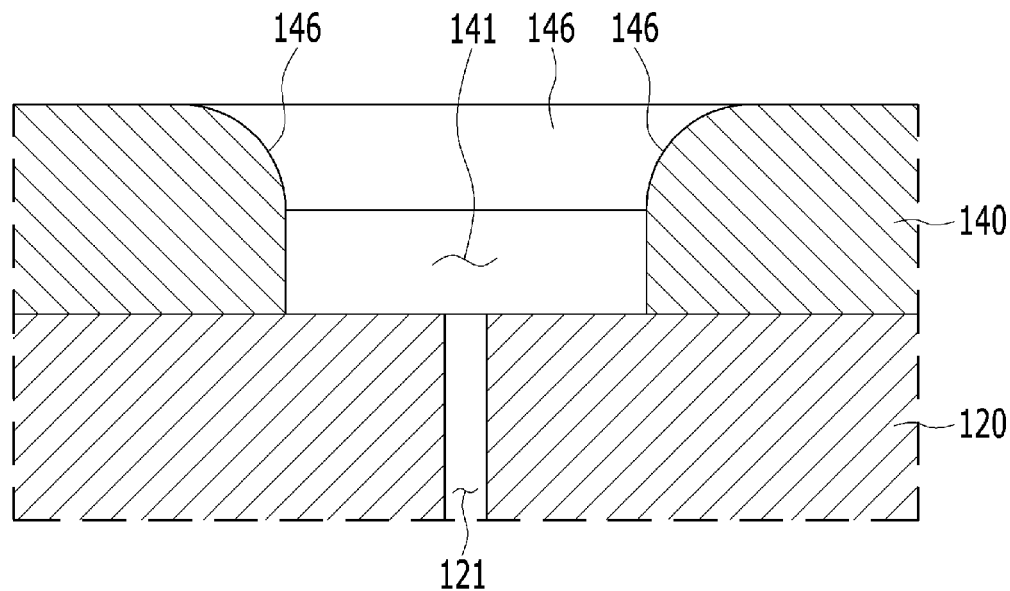
[FIG. 19]
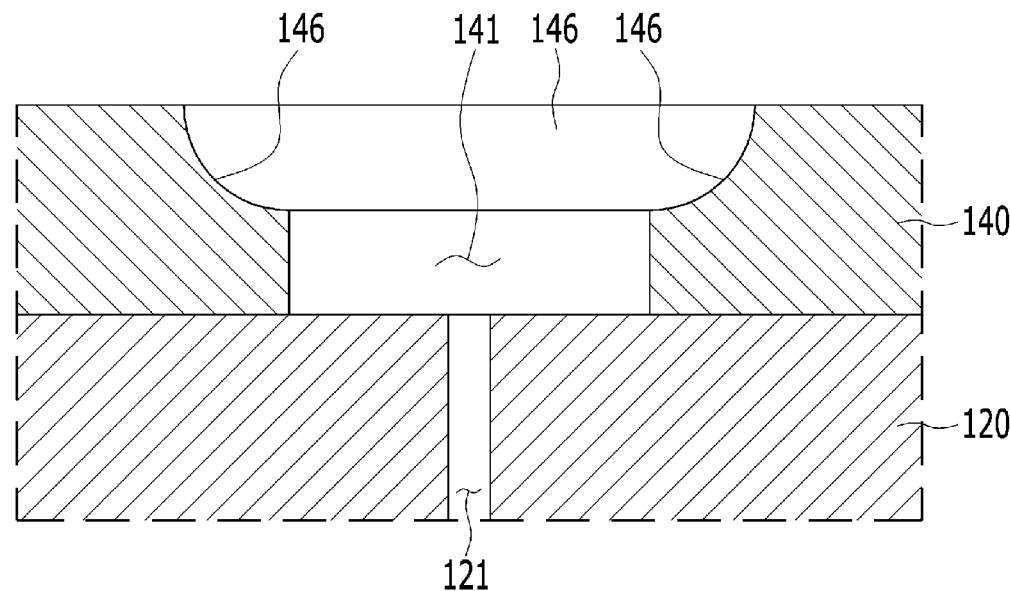

RADAR ANTENNA

TECHNICAL FIELD

The present disclosure relates to an antenna, and more particularly, to a radar antenna.

BACKGROUND ART

It is on trend to use a radar antenna for signal transmission and reception for detecting an object around a vehicle. The radar antenna radiates radio waves onto an object, and makes it possible to detect the existence/nonexistence, distance, movement direction, movement speed, identification, and classification of the object by means of reflected waves or scattered waves having bounced off the object.

Recently, for an advancement of anti-collision radar of an autonomous vehicle to cope with a driverless vehicle era, technologies to widen the detection range and to heighten the performance of such a radar antenna have been researched.

In the radar antenna in the related art, since a plurality of radiators that play different roles are arranged, mutual coupling occurs among the radiators to cause independent performances of the radiators to deteriorate or to cause the radiation performance of the antenna to deteriorate.

The above matter described as a background technology is to help understanding of the background of the present disclosure, and may include the matter that is not the technology in the related art already known to those of ordinary skill in the art to which the present disclosure pertains.

DISCLOSURE

Technical Problem

The present disclosure has been proposed to solve the above-described problems, and an object of the present disclosure is to provide a radar antenna, which can prevent mutual coupling between antennas by forming a shielding space corresponding to each antenna of an antenna body by using accommodation holes of shielding members.

Technical Solution

In order to achieve that above object, a radar antenna according to an embodiment of the present disclosure includes: an antenna body which has a first surface and a second surface and in which a plurality of first slot groups are formed to be spaced apart from one another on the first surface; and a shielding member which is stacked on the first surface of the antenna body and in which a plurality of accommodation holes are formed to overlap the plurality of first slot groups, respectively.

The first slot group may include a plurality of first slots in a matrix arrangement, and the first surface of the antenna body may include a plurality of areas in which the plurality of first slots are disposed. In this case, the plurality of accommodation holes may overlap the plurality of areas in which the plurality of first slots are disposed.

The first surface of the antenna body and inner walls of the accommodation holes of the shielding member may form shielding spaces, and the inner walls of the accommodation holes may be spaced apart from outer circumference of areas occupied by the first slot group over a predetermined distance. In other words, the inner walls of the accommodation holes may be spaced apart from the outer circumference of the areas formed by the plurality of first slots included in the first slot group over the predetermined distance.

The shielding member may include a plurality of shielding plates stacked on the antenna body to be spaced apart from one another, two or more accommodation holes may be formed on the shielding plates of the shielding member, and the shielding plates of the shielding member may be stacked on the antenna body so as to overlap two or more of the plurality of first slot groups. In this case, a protrusion part extending in an outward direction or a groove part formed in an inward direction of the shielding plates may be formed on at least one of the plurality of shielding plates.

The shielding member may include a plurality of shielding blocks stacked on the antenna body to be spaced apart from one another, one accommodation hole may be formed on the shielding blocks of the shielding member, and the shielding blocks of the shielding member may be stacked on the antenna body so as to overlap one of the plurality of first slot groups.

The shielding member may include a chamfer part chamfered along a corner formed by the accommodation hole, and the chamfer part may be formed by chamfering the corner in a direction of the first surface of the shielding member.

The radar antenna according to an embodiment of the present disclosure may further include a slot member formed in a metal frame shape and configured to be inserted into the first slot formed on the antenna body.

Advantageous Effects

According to the present disclosure, the radar antenna has the effect of being able to prevent the mutual coupling among the antennas formed on the antenna body since the shielding spaces corresponding to the respective antennas of the antenna body are formed by using the accommodation holes of the shielding member. That is, according to the radar antenna, since the shielding member on which the accommodation holes are formed is stacked on the antenna body on which the plurality of antennas (slots) are formed, the antennas can be disposed in the shielding spaces formed by the accommodation holes and the antenna body, and thus the mutual coupling with other antennas can be prevented.

Further, since the radar antenna can prevent the mutual coupling among the antennas through stacking of the shielding member on the antenna body, the independent antenna performances of the plurality of antennas formed on the antenna body can be maintained, and thus the radiation performance of the radar antenna can be prevented from being degraded.

DESCRIPTION OF DRAWINGS

FIG. 1 is a perspective view of a radar antenna according to an embodiment of the present disclosure.

FIG. 2 is an exploded perspective view of a radar antenna when viewed in a direction of a first surface of the radar antenna according to an embodiment of the present disclosure.

FIG. 3 is an exploded perspective view of a radar antenna when viewed in a direction of a second surface that faces a first surface of the radar antenna according to an embodiment of the present disclosure.

FIG. 4 is a view explaining a first slot formed on the antenna body of FIG. 1.

FIG. 5 is a view explaining a second slot formed on the antenna body of FIG. 1.

FIGS. 6 and 7 are views explaining a waveguide formed on the antenna body of FIG. 1.

FIG. 8 is a view explaining a modified example of the antenna body of FIG. 1.

FIGS. 9 and 10 are views explaining the shielding member of FIG. 1.

FIG. 11 is a view explaining accommodation grooves of the shielding member of FIG. 9.

FIGS. 12 and 13 are views explaining a first modified example of the shielding member of FIG. 1.

FIG. 14 is a view explaining a second modified example of the shielding member of FIG. 1.

FIG. 15 is a view explaining an example of a chamfered surface formed in accommodation holes of the shielding member of FIG. 1.

FIGS. 16 to 19 are views explaining an example of the chamfered surface of FIG. formed in different shapes.

MODE FOR INVENTION

For detailed explanation to the extent that those of ordinary skill in the art to which the present disclosure pertains can easily embody the technical idea of the present disclosure, the most preferred embodiment of the present disclosure will be described with reference to the accompanying drawings. First, in giving reference numerals to constituent elements of the respective drawings, it is to be noted that the same constituent elements have possibly the same reference numerals although they are denoted in different drawings. Further, in describing the present disclosure, detailed explanation of related known constitutions or functions will be omitted in case that such detailed explanation may obscure the subject matter of the present disclosure.

Referring to FIGS. 1 to 3, a radar antenna 100 according to an embodiment of the present disclosure is configured to include antennas and a shielding member 140.

An antenna body 120 forms an appearance of the radar antenna 100, and is formed in a flat plate shape having a predetermined thickness. The antenna body 120 has a first surface F1 and a second surface F2 facing the first surface F1. In this case, a board is disposed on the second surface F2 of the antenna body 120. The board 10 transmits radio waves to outside through the radar antenna 100, and receives and performs signal processing of the radio waves received through the radar antenna 100. Here, it is exemplified that the first surface F1 is a front surface of the antenna body 120, and the second surface F2 is a rear surface of the antenna body 120.

Referring to FIG. 4, a plurality of first slots 121 are formed on the first surface F1 of the antenna body 120. The plurality of first slots 121 formed on the first surface F1 of the antenna body 120 are classified into a plurality of first slot groups, and the plurality of first slot groups constitute respective antennas. In this case, the first slot group 121 constitutes one of an antenna for radiation and an antenna for reception. Here, the antenna for radiation is an antenna that radiates radio waves, and the antenna for reception is an antenna that receives the radio waves bounced and reflected from an object hit by the radio waves radiated from the antenna for radiation.

As an example, referring to FIG. 4, on the first surface F1 of the antenna body 120, a plurality of the (1-1)-th slots 121a, a plurality of the (1-2)-th slots 121b, a plurality of the (1-3)-th slots 121c, a plurality of the (1-4)-th slots 121d, a plurality of the (1-5)-th slots 121e, and a plurality of the (1-6)-th slots 121f are formed, and 6 antennas are formed.

The plurality of the (1-1)-th slots 121a constitute a first antenna through matrix arrangement in a first area A1. The first area A1 is a partial area of the first surface F1 of the antenna body 120, and is an area adjacent to a first side surface S1 and a fourth side surface S4 of the antenna body 120.

The plurality of the (1-2)-th slots 121b constitute a second antenna through matrix arrangement in a second area A2. The second area A2 is a partial area of the first surface F1 of the antenna body 120, and is an area adjacent to a third side surface S3 and spaced apart for a predetermined distance from the first area A1 downward.

The plurality of the (1-3)-th slots 121c constitute a third antenna through matrix arrangement in a third area A3. The third area A3 is a partial area of the first surface F1 of the antenna body 120, and is an area adjacent to a first side surface S1 and spaced apart for a predetermined distance from the first area A1 rightward.

The plurality of the (1-4)-th slots 121d constitute a fourth antenna through matrix arrangement in a fourth area A4. The fourth area A4 is a partial area of the first surface F1 of the antenna body 120, and is an area adjacent to the third side surface S3, spaced apart for a predetermined distance from the second area A2 rightward, and spaced apart for a predetermined distance from the third area A3 downward.

The plurality of the (1-5)-th slots 121e constitute a fifth antenna through matrix arrangement in a fifth area A5. The fifth area A5 is a partial area of the first surface F1 of the antenna body 120, and is an area adjacent to the first side surface S1 and the second side surface S2, and spaced apart for a predetermined distance from the third area A3 rightward.

The plurality of the (1-6)-th slots 121f constitute a sixth antenna through matrix arrangement in a sixth area A6. The sixth area A6 is a partial area of the first surface F1 of the antenna body 120, and is an area adjacent to the second side surface S2 and the third side surface S3, spaced apart for a predetermined distance from the fourth area A4 rightward, and spaced apart for a predetermined distance from the fifth area A5 downward.

In this case, the first to sixth antennas operate as radiation antennas radiating the radio waves or reception antennas receiving the radio waves bounced and reflected from the object hit by the radio waves radiated from the radiation antenna.

Here, although it is exemplified that 6 antennas are formed in order to explain the antenna body 120 in FIG. 4, the number of antennas may be changed depending on the required antenna characteristic, and thus is not limited thereto.

A plurality of second slots 122 are formed on the second surface F2 of the antenna body 120. The plurality of second slots 122 constitute a reception port and a transmission port. That is, the plurality of second slots 122 are configured as the transmission port connected to a transmission terminal of the board 10, or are configured as the reception port that is connected to a reception terminal of the board 10.

The plurality of second slots 122 are configured to match the antennas formed on the first surface F1 of the antenna body 120. One or more second slots 122 match the antennas formed on the first surface F1 of the antenna body 120. Accordingly, the number of second slots 122 is equal to or larger than the number of antennas formed on the first surface F1 of the antenna body 120.

As an example, referring to FIG. 5, on the second surface F2 of the antenna body 120, the (2-1)-th slot 122a, the (2-2)-th slot 122b, the (2-3)-th slot 122c, the (2-4)-th slot 122d, the (2-5)-th slot 122e, and the (2-6)-th slot 122f are formed.

The (2-1)-th slot 122a is formed on the second surface F2 of the antenna body 120, but is formed to overlap the first area A1 on the first surface F1 of the antenna body 120.

The (2-2)-th slot 122b is formed on the second surface F2 of the antenna body 120, but is formed to overlap the second area A2 on the first surface F1 of the antenna body 120.

The (2-3)-th slot 122c is formed on the second surface F2 of the antenna body 120, but is formed to overlap the third area A3 on the first surface F1 of the antenna body 120.

The (2-4)-th slot 122d is formed on the second surface F2 of the antenna body 120, but is formed to overlap the fourth area A4 on the first surface F1 of the antenna body 120.

The (2-5)-th slot 122e is formed on the second surface F2 of the antenna body 120, but is formed to overlap the fifth area A5 on the first surface F1 of the antenna body 120.

The (2-6)-th slot 122f is formed on the second surface F2 of the antenna body 120, but is formed to overlap the sixth area A6 on the first surface F1 of the antenna body 120.

A plurality of waveguides 123 that are paths for moving the radio waves are formed inside the antenna body 120. The waveguides 123 form radio wave movement paths which connect the plurality of first slots 121 and the plurality of second slots 122 to each other, and move the radio waves between the first slots 121 and the second slots 122.

As an example, referring to FIGS. 6 and 7, the waveguide 123 is formed inside the antenna body 120, and forms the radio wave movement path for moving (radiating) the radio waves output from the board 10 to an outside of the radar antenna 100 or moving the radio waves reflected from an object to the board 10 (i.e., reception terminal).

Meanwhile, since the radar antenna is an antenna composed of a plurality of slots, the antenna performance is sensitively changed depending on the dimensions (size) of the slots in a high frequency band of about 76.5 GHz.

In case that the radar antenna is produced of plastic to lower the product unit price (production unit price), the radar antenna has the problems in that it is difficult to precisely process the dimensions (size) of the slots due to the production tolerance, and it is difficult to implement the constant antenna performance due to the dimension change of the slots.

Accordingly, referring to FIG. 8, the radar antenna 100 according to an embodiment of the present disclosure may further include a plurality of slot members 150 inserted into the first slots 121.

The slot member 150 is formed of a metal material, and is formed in the shape of a frame in which the slot is formed. The slot member 150 is fixedly inserted into the first slot 121 of the antenna body 120. For this, the slot member 150 is formed to have the same dimensions as the design dimensions of the first slot 121.

In the radar antenna 100, since the slot member 150 is inserted in a manner of being fitted into the first slot 121, the production tolerance can be reduced, and thus the dimensions of the first slot 121 can be constantly formed.

Further, in case that dimension inferiority of the first slot 121 occurs, the dimensions can be constantly maintained by replacing the slot member 150, and thus the radar antenna 100 has an additional effect of heightening the yield.

Further, the radar antenna 100 can constantly implement the antenna performance by making the dimensions of the first slot 121 constant.

The above-described antenna body 120 may operate as the radar antenna 100 by itself. However, since the antenna body 120 includes a plurality of antennas which transmit/receive the frequency band to/from each other or operate for frequency transmission or reception, mutual coupling among the antennas may occur to deteriorate independent antenna performances.

Accordingly, the radar antenna 100 according to an embodiment of the present disclosure further includes the shielding member 140 stacked on the first surface F1 of the antenna body 120 to prevent the mutual coupling among the antennas.

The shielding member 140 is stacked on the first surface F1 of the antenna body 120 on which the plurality of first slots 121 are formed. The shielding member 140 may be formed of a metal that shields signals to prevent the mutual coupling between the antennas formed by the plurality of first slots 121. However, the shielding member 140 may be replaced by another material other than the metal, or another metal depending on the antenna specifications required in the radar antenna 100.

Further, the thickness of the shielding member 140 and the gap between the first slot 121 and the shielding member 140 may differ depending on the antenna characteristics, antenna sizes, and surrounding environments. Accordingly, in an embodiment of the present disclosure, the material, shape, thickness, and gap of the shielding member 140 are not limited to numbers.

Referring to FIGS. 9 and 10, the shielding member 140 has a first surface F3 and a second surface F4, and the second surface F4 is stacked on the first surface F1 of the antenna body 120.

A plurality of accommodation holes 141 for accommodating the first slots 121 are formed on the shielding member 140. The accommodation holes 141 accommodate some of the plurality of first slots 121, but accommodate the plurality of first slots 121 belonging to the same slot group. The accommodation holes 141 are formed to penetrate the shielding member 140 in the shape of a flat plate, and are formed in the shape of a quadrangle when viewed in a direction of the first surface F1 of the antenna body 120. In this case, the accommodation holes 141 may be formed in another shape, such as in the shape of a circle, depending on the required antenna specifications.

The shielding member 140 forms shielding spaces for preventing the mutual coupling among the antennas formed by the plurality of first slots 121. As the shielding member 140 is stacked on the antenna body 120, the accommodation holes 141 and the first surface F1 of the antenna body 120 form the shielding spaces. The inner walls of the accommodation holes 141 form shielding walls that are outer walls of the shielding spaces for shielding between the antennas formed by the first slots 121, and the first surface F1 of the antenna body 120 forms the bottom surface of the shielding spaces. Accordingly, the antenna body 120 and the shielding member 140 form the shielding spaces being open in the direction of the first surface F3 of the shielding member 140. Through this, the shielding member 140 can prevent the mutual coupling among the antennas being formed by the plurality of first slots 121.

As an example, the plurality of accommodation holes 141 include a first accommodation hole 141a, a second accommodation hole 141b, a third accommodation hole 141c, a fourth accommodation hole 141d, a fifth accommodation hole 141e, and a sixth accommodation hole 141f.

The first accommodation hole 141a is formed in an area that overlaps the first area A1 of the antenna body 120 on which a plurality of the (1-1)-th slots 121a are formed. As the shielding member 140 is stacked on the antenna body 120, the first accommodation hole 141a accommodates the plurality of the (1-1)-th slots 121a. On the inner wall of the first accommodation hole 141a and the first surface F1 of the antenna body 120, the first area A1 forms first shielding spaces SA1, and since the first shielding spaces SA1 are open in the direction of the first surface F3 of the shielding member 140, the first shielding spaces SA1 do not exert an influence on the radiation and reception of the radio waves, and block the mutual coupling between the first antenna being formed by the plurality of the (1-1)-th slots 121a and other antennas.

The second accommodation hole 141b is formed in an area that overlaps the second area A2 of the antenna body 120 on which a plurality of the (1-2)-th slots 121b are formed. As the shielding member 140 is stacked on the antenna body 120, the second accommodation hole 141b accommodates the plurality of the (1-2)-th slots 121b. On the inner wall of the second accommodation hole 141b and the first surface F1 of the antenna body 120, the second area A2 forms second shielding spaces SA2, and since the second shielding spaces SA2 are open in the direction of the first surface F3 of the shielding member 140, the second shielding spaces SA2 do not exert an influence on the radiation and reception of the radio waves, and block the mutual coupling between the second antenna being formed by the plurality of the (1-2)-th slots 121b and other antennas.

The third accommodation hole 141c is formed in an area that overlaps the third area A3 of the antenna body 120 on which a plurality of the (1-3)-th slots 121c are formed. As the shielding member 140 is stacked on the antenna body 120, the third accommodation hole 141c accommodates the plurality of the (1-3)-th slots 121c. On the inner wall of the third accommodation hole 141c and the first surface F1 of the antenna body 120, the third area A3 forms third shielding spaces SA3, and since the third shielding spaces SA3 are open in the direction of the first surface F3 of the shielding member 140, the third shielding spaces SA3 do not exert an influence on the radiation and reception of the radio waves, and block the mutual coupling between the third antenna being formed by the plurality of the (1-3)-th slots 121c and other antennas.

The fourth accommodation hole 141d is formed in an area that overlaps the fourth area A4 of the antenna body 120 on which a plurality of the (1-4)-th slots 121d are formed. As the shielding member 140 is stacked on the antenna body 120, the fourth accommodation hole 141d accommodates the plurality of the (1-4)-th slots 121d. On the inner wall of the fourth accommodation hole 141d and the first surface F1 of the antenna body 120, the fourth area A4 forms fourth shielding spaces SA4, and since the fourth shielding spaces SA4 are open in the direction of the first surface F3 of the shielding member 140, the fourth shielding spaces SA4 do not exert an influence on the radiation and reception of the radio waves, and block the mutual coupling between the fourth antenna being formed by the plurality of the (1-4)-th slots 121d and other antennas.

The fifth accommodation hole 141e is formed in an area that overlaps the fifth area A5 of the antenna body 120 on which a plurality of the (1-5)-th slots 121e are formed. As the shielding member 140 is stacked on the antenna body 120, the fifth accommodation hole 141e accommodates the plurality of the (1-5)-th slots 121e. On the inner wall of the fifth accommodation hole 141e and the first surface F1 of the antenna body 120, the fifth area A5 forms fifth shielding spaces SA5, and since the fifth shielding spaces SA5 are open in the direction of the first surface F3 of the shielding member 140, the fifth shielding spaces SA5 do not exert an influence on the radiation and reception of the radio waves, and block the mutual coupling between the fifth antenna being formed by the plurality of the (1-5)-th slots 121e and other antennas.

The sixth accommodation hole 141f is formed in an area that overlaps the sixth area A6 of the antenna body 120 on which a plurality of the (1-6)-th slots 121f are formed. As the shielding member 140 is stacked on the antenna body 120, the sixth accommodation hole 141f accommodates the plurality of the (1-6)-th slots 121f. On the inner wall of the sixth accommodation hole 141f and the first surface F1 of the antenna body 120, the sixth area A6 forms fifth shielding spaces SA6, and since the sixth shielding spaces SA6 are open in the direction of the first surface F3 of the shielding member 140, the sixth shielding spaces SA6 do not exert an influence on the radiation and reception of the radio waves, and block the mutual coupling between the sixth antenna being formed by the plurality of the (1-6)-th slots 121f and other antennas.

Meanwhile, if the inner walls of the accommodation holes and the outer circumference of the area in which the first slots 121 are formed are spaced apart from each other below a predetermined gap, the radiation or reception performance of the radio waves may deteriorate.

Accordingly, referring to FIG. 11, the inner walls of the accommodation holes 141 are disposed to be spaced apart from the first slots 121 formed on the first surface F1 of the antenna body 120 over a predetermined gap d. That is, the inner walls of the accommodation holes 141 are disposed to be spaced apart from the outer circumference of the area in which the first slots 121 are formed over the predetermined gap (predetermined distance) d. Here, the predetermined gap d may differ depending on the size of the radar antenna 100 and the antenna characteristics, and is not limited to numbers.

Referring to FIG. 12, the shielding member 140 may include a plurality of shielding plates 142. That is, the shielding member 140 may include a first shielding plate 142a, a second shielding plate 142b, and a third shielding plate 142c.

The first shielding plate 142a is stacked on the first surface F1 of the antenna body 120, but is stacked to overlap the first area A1 and the second area A2 of the antenna body 120. The first accommodation hole 141a and the second accommodation hole 141b are formed on the first shielding plate 142a, and the first shielding plate 142a forms the first shielding space SA1 and the second shielding space SA2 as being stacked on the antenna body 120.

The second shielding plate 142b is stacked on the first surface F1 of the antenna body 120, but is stacked to overlap the third area A3 and the fourth area A4 of the antenna body 120. The third accommodation hole 141c and the fourth accommodation hole 141d are formed on the second shielding plate 142b, and the second shielding plate 142b forms the third shielding space SA3 and the fourth shielding space SA4 as being stacked on the antenna body 120.

The third shielding plate 142c is stacked on the first surface F1 of the antenna body 120, but is stacked to overlap the fourth area A4 and the fifth area A5 of the antenna body 120. The fifth accommodation hole 141e and the sixth accommodation hole 141f are formed on the third shielding plate 142c, and the third shielding plate 142c forms the fifth shielding space SA5 and the sixth shielding space SA6 as being stacked on the antenna body 120.

In this case, referring to FIG. 13, a protrusion part 143 or a groove part 144 may be further formed on the first shielding plate 142a to the third shielding plate 142c in accordance with the antenna specifications. Here, it is exemplified that the protrusion part 143 is an area extending in an outward direction (or lateral direction) on the shielding plate 142, and the groove part 144 is an area formed in an inward direction of the shielding plate 142 through removal of a part of the shielding plate 142.

Referring to FIG. 14, the shielding member may be composed of a plurality of shielding blocks 145.

As an example, the shielding member 140 may include a first shielding block 145*a*, a second shielding block 145*b*, a third shielding block 145*c*, a fourth shielding block 145*d*, a fifth shielding block 145*e*, and a sixth shielding block 145*f*.

The first shielding block 145*a* is stacked on the first surface F1 of the antenna body 120, but is stacked to overlap the first area A1 of the antenna body 120. The first accommodation hole 141*a* is formed on the first shielding block 145*a*, and the first shielding block 145*a* forms the first shielding space SA1 as being stacked on the antenna body 120.

The second shielding block 145*b* is stacked on the first surface F1 of the antenna body 120, but is stacked to overlap the second area A2 of the antenna body 120. The second accommodation hole 141*b* is formed on the second shielding block 145*b*, and the second shielding block 145*b* forms the second shielding space SA2 as being stacked on the antenna body 120.

The third shielding block 145*c* is stacked on the first surface F1 of the antenna body 120, but is stacked to overlap the third area A3 of the antenna body 120. The third accommodation hole 141*c* is formed on the third shielding block 145*c*, and the third shielding block 145*c* forms the third shielding space SA3 as being stacked on the antenna body 120.

The fourth shielding block 145*d* is stacked on the first surface F1 of the antenna body 120, but is stacked to overlap the fourth area A4 of the antenna body 120. The fourth accommodation hole 141*d* is formed on the fourth shielding block 145*d*, and the fourth shielding block 145*d* forms the fourth shielding space SA4 as being stacked on the antenna body 120.

The fifth shielding block 145*e* is stacked on the first surface F1 of the antenna body 120, but is stacked to overlap the fifth area A5 of the antenna body 120. The fifth accommodation hole 141*e* is formed on the fifth shielding block 145*e*, and the fifth shielding block 145*e* forms the fifth shielding space SA5 as being stacked on the antenna body 120.

The sixth shielding block 145*f* is stacked on the first surface F1 of the antenna body 120, but is stacked to overlap the sixth area A6 of the antenna body 120. The sixth accommodation hole 141*f* is formed on the sixth shielding block 145*f*, and the sixth shielding block 145*f* forms the sixth shielding space SA6 as being stacked on the antenna body 120.

Referring to FIG. 15, in order to improve a gain of the radar antenna 100, a chamfer part 146 may be formed on the shielding member 140. The chamfer part 146 is formed by chamfering the corner of the area in which the accommodation holes 141 are formed on the shielding member 140. The chamfer part 146 is formed along the upper corner of the shielding member 140.

In this case, the chamfer part 146 may be formed in various shapes in accordance with the antenna characteristics.

As an example, referring to FIG. 16, the chamfer part 146 is formed in a diagonal shape based on a cutting plane obtained by cutting the shielding member 140 based on line A-A', but is chamfered to form a predetermined angle $\theta1$ with the upper surface of the shielding member 140.

In this case, referring to FIG. 17, the chamfer part 146 is formed in a diagonal shape based on a cutting plane obtained by cutting the shielding member 140 based on line A-A', but is chamfered to form another predetermined angle $\theta2$ with the upper surface of the shielding member 140.

As another example, referring to FIG. 18, the chamfer part 146 may be formed in the shape of an annular surface obtained by chamfering round the corners based on the cutting plane obtained by cutting the shielding member 140 based on line A-A'.

As another example, referring to FIG. 19, the chamfer part 146 may be formed in the shape of a concave surface obtained by concavely chamfering the corners based on the cutting plane obtained by cutting the shielding member 140 based on line A-A'.

Here, although FIGS. 16 to 19 are exemplarily illustrated for easy explanation of the chamfer part 146, the chamfer part 146 is not limited thereto, and may be modified in various shapes in accordance with the characteristics and the purpose of the antenna.

As described above, although a preferred embodiment according to the present disclosure has been described, it is understood that various modifications are possible, and those of ordinary skill in the corresponding technical field can make various modifications and correction examples without deviating from the claims of the present disclosure.

The invention claimed is:

1. A radar antenna comprising:
   an antenna body which has a first surface and a second surface and in which a plurality of first slot groups are formed to be spaced apart from one another on the first surface;
   a shielding member which is stacked on the first surface of the antenna body and in which a plurality of accommodation holes are formed to overlap the plurality of first slot groups, respectively; and
   a slot member formed in a metal frame shape and configured to be inserted into a first slot formed on the antenna body.

2. The radar antenna of claim 1, wherein each first slot group of the plurality of first slot groups comprises a plurality of first slots in a matrix arrangement.

3. The radar antenna of claim 1, wherein the first surface of the antenna body comprises a plurality of areas in which a plurality of first slots are disposed.

4. The radar antenna of claim 3, wherein the plurality of accommodation holes overlap the plurality of areas in which the plurality of first slots are disposed.

5. The radar antenna of claim 1, wherein the first surface of the antenna body and inner walls of the accommodation holes of the shielding member form shielding spaces.

6. The radar antenna of claim 1, wherein the inner walls of the accommodation holes are spaced apart from outer peripheries of areas occupied by a first slot group over a predetermined distance.

7. The radar antenna of claim 1, wherein inner walls of the accommodation holes are spaced apart from the outer peripheries of the areas formed by a plurality of first slots included in a first slot group over the predetermined distance.

8. The radar antenna of claim 1, wherein the shielding member comprises a plurality of shielding plates stacked on the antenna body to be spaced apart from one another,
   two or more accommodation holes are formed on a shielding plate of the shielding member, and the shielding plate of the shielding member is stacked on the antenna body so as to overlap two or more first slot groups of the plurality of first slot groups.

9. The radar antenna of claim 8, wherein a protrusion part extending in an outward direction is formed on at least one of the plurality of shielding plates.

10. The radar antenna of claim 8, wherein a part of at least one of the plurality of shielding plates is removed, and a groove part formed in an inward direction of the shielding plates is formed thereon.

11. The radar antenna of claim 1, wherein the shielding member comprises a plurality of shielding blocks stacked on the antenna body to be spaced apart from one another,
one accommodation hole is formed on a shielding block of the shielding member, and
the shielding block of the shielding member is stacked on the antenna body so as to overlap one first slot group of the plurality of first slot groups.

12. The radar antenna of claim 1, wherein the shielding member comprises a chamfer part chamfered along a corner formed by an accommodation hole.

13. The radar antenna of claim 12, wherein the chamfer part is formed by chamfering the corner in a direction of the first surface of the shielding member.

* * * * *